(12) United States Patent
Dugonjic-Bilic et al.

(10) Patent No.: US 9,688,908 B2
(45) Date of Patent: Jun. 27, 2017

(54) TEMPERATURE-STABLE, ELECTROLYTIC HYDROGEL AND METHOD FOR STIMULATING CRUDE OIL AND NATURAL GAS DEPOSITS

(71) Applicant: TOUGAS OILFIELD SOLUTIONS GMBH, Frankfurt am Main (DE)

(72) Inventors: Fatima Dugonjic-Bilic, Offenbach (DE); Carolin Usener, Dülmen (DE); Marita Neuber, Dreieich (DE); Margarethe Pfahls, Frankfurt am Main (DE); Marion Wissel, Mömbris (DE)

(73) Assignee: TOUGAS OILFIELD SOLUTIONS GMBH, Frankfurt am Main (DE)

( * ) Notice: Subject to any disclaimer, the term of this patent is extended or adjusted under 35 U.S.C. 154(b) by 52 days.

(21) Appl. No.: 14/890,196

(22) PCT Filed: May 22, 2014

(86) PCT No.: PCT/EP2014/001380
§ 371 (c)(1),
(2) Date: Nov. 10, 2015

(87) PCT Pub. No.: WO2014/187565
PCT Pub. Date: Nov. 27, 2014

(65) Prior Publication Data
US 2016/0122627 A1 May 5, 2016

(30) Foreign Application Priority Data

May 23, 2013 (DE) .................. 10 2013 008 769

(51) Int. Cl.
| | |
|---|---|
| *E21B 43/26* | (2006.01) |
| *C09K 8/60* | (2006.01) |
| *C09K 8/68* | (2006.01) |
| *C08F 220/56* | (2006.01) |
| *C08J 3/075* | (2006.01) |
| *C09K 8/70* | (2006.01) |
| *C09K 8/88* | (2006.01) |

(52) U.S. Cl.
CPC ............ *C09K 8/685* (2013.01); *C08F 220/56* (2013.01); *C08J 3/075* (2013.01); *C09K 8/70* (2013.01); *C09K 8/882* (2013.01); *C09K 8/887* (2013.01); *E21B 43/26* (2013.01); *C08J 2343/02* (2013.01)

(58) Field of Classification Search
CPC ............ C09K 8/685; C09K 8/68; E21B 43/26
See application file for complete search history.

(56) References Cited

U.S. PATENT DOCUMENTS

| | | | | |
|---|---|---|---|---|
| 5,080,809 A | * | 1/1992 | Stahl | ................ C08F 226/06 166/270.1 |
| 6,986,391 B2 | | 1/2006 | Funkhouser | |
| 8,022,015 B2 | | 9/2011 | Carman | |
| 2006/0019835 A1 | | 1/2006 | Kayser | |
| 2009/0023613 A1 | * | 1/2009 | Li | ........................ C09K 8/528 507/211 |

FOREIGN PATENT DOCUMENTS

EP    2166060    3/2010

OTHER PUBLICATIONS

Oct. 15, 2014, Plehiers, Mark, "International Search Report", PCT/EP2014/001380.

* cited by examiner

*Primary Examiner* — Zakiya W Bates
(74) *Attorney, Agent, or Firm* — Neifeld IP Law, P.C.

(57) ABSTRACT

The invention relates to a temperature-stable hydrogel comprising electrolytic water and a copolymer cross-linked to multivalent metal ions. The invention is characterized in that the copolymer contains at least structural units which are derived at up to 0.005-20% by weight from an ethylenically unsaturated phosphonic acid and alkali metal salts thereof and/or ammonia salts, up to 5-40% by weight from an ethylenically unsaturated sulfuric acid and alkali metal salts thereof and/or ammonia salts and up to 5-94.995% by weight from an amide of an ethylenically unsaturated carboxylic acid selected from the group of acrylamide, methacrylamide and/or $C_1$-$C_4$ alkyl derivatives, wherein the percentages are based on the total mass of the monomers used during copolymerization, and that the multivalent metal ions for cross-linking of the copolymers belong to the groups IIIA, IVB, VB, VIIIB and/or VIIIB of the periodic system of elements.

18 Claims, 15 Drawing Sheets

TEMPERATURE-STABLE, ELECTROLYTIC HYDROGEL AND METHOD FOR STIMULATING CRUDE OIL AND NATURAL GAS DEPOSITS

CROSS REFERENCE TO RELATED APPLICATIONS

This application is a national stage entry of PCT/EP2014/001380, filed May 22, 2014, which published as WO 2014/187565 in a language other than English on Nov. 27, 2014 which claims priority to German Application No. 10 2013 008 769.4, filed May 23, 2013; and all of the preceding applications are incorporated herein by reference.

The present invention relates to a temperature-stable, electrolyte-containing hydrogel and its use in the production of crude oil and natural gas from unconventional or greatly exploited deposits.

The deposits of fossil energy carriers are widely exploited and the reserves are limited. With new and further developed technologies however, crude oil and natural gas deposits can be further exploited or unconventional deposits can also be opened up.

Unconventional natural gas deposits have a significantly lower permeability than conventional ones. From the production technology point of view, this low initial permeability means that the penetrability of the rock mass under certain conditions must be artificially increased before extraction by appropriate stimulation measures (hydraulic breaking up, in English also called "hydraulic fracturing" or "fracking").

For this purpose a liquid ("fract fluid") is pressed into the borehole at high pressure in order to produce cracks in the reservoir rock, expand these and stabilise them by supporting bodies such as sand or ceramic spheres.

The gas and liquid permeability of the rock layer is thereby increased so that fluids such as natural gas, crude oil or water can flow more easily to the borehole. This increases the economic viability of the crude oil and natural gas production. In the area of geothermal boreholes, the yield from water reservoirs can also be enhanced by the method of hydraulic fracturing. Following the stimulation, water flows better through the rock and the rock absorbs more heat. Ground water wells can also be stimulated by this method. Furthermore, in some cases it is also possible to hydraulically fracture boreholes for long-term pre-degassing in coal mines.

In existing conventional oil and gas fields hydraulic fracturing is used to make residual quantities of liquid and gaseous fossil raw materials accessible, of which the volume produced decreases due to a low permeability of the reservoir rock. In unconventional deposits a sufficient permeability of the rock is created by the method so that especially natural gas can be released from the reservoir and extracted.

In hydraulic fracturing horizontal boreholes are usually inserted inside the deposits. The borehole is charged with frac fluid at high pressure and monitored seismically in order to be able to control the crack propagation by means of the pressure level.

The pressure reached in this case in the region to be fractured must exceed the lowest stress present in the rock. If this is the case, the fluid presses the rock apart. Normally the low stress directions lie in the horizontal since the perpendicular lithostatic pressure (from the gravity of the supporting rock layers) forms the main stress without further influences. Thus, fissures formed by hydraulic fracturing are predominantly oriented in approximately perpendicular surfaces—and following surfaces which are again perpendicular to these.

After the "blasting" of these cracks, the pressed-in liquid laden with sand or supporting bodies is pumped back as far as possible. The added solids remain in the cracks and have the task of keeping these open against the acting rock pressure.

Also residues of the frac fluid tend to remain in the rock due to adhesion effects at the liquid-solid phase boundaries.

In addition to the supporting bodies, a plurality of additives can be present in the frac fluid, e.g.:
  gels for increasing the viscosity of the frac fluid and for better transport of sand
  foams for the transport and deposition of the sand, for example, nitrogen or carbon dioxide
  clay inhibitors to prevent the swelling of clay in the formations, for example, potassium chloride, trimethyl ammonium chloride or choline chloride
  acids for dissolving minerals, for example, hydrochloric acid, acetic acid or formic acid
  anticorrosives for protecting installations, in particular with addition of acids
  crushers for reducing the viscosity of the frac fluid for better recovery of the fluids, for example, acids, oxidizing agents and/or enzymes
  biocides for preventing bacterial growth at organic components
  fluid loss additives for reducing the outflow of frac fluid into the surrounding rock, usually natural or synthetic polymers
  friction modifiers for reducing friction inside the fluids, for example, latex polymers or acrylamide copolymers
  pH buffers for stabilizing the pH, for example, acetic acid-acetate-buffer or borate buffer.

The hydrogels described below are used according to the invention as gels in frac fluids.

In many cases, polysaccharides or modified polysaccharides are used to produce gels to increase the viscosity. Commonly used polysaccharide-based polymers are cellulose ether derivatives or guar and its hydroxypropyl or carboxymethyl derivatives. The gels are obtained from the polymers by cross-linking the individual polymer chains with one another and producing a three-dimensional gel in this way. The cross-linking of such polysaccharides typically takes place in an alkaline environment by adding boron compounds.

Disadvantages of these polysaccharide-based polymers are:
  long hydration times
  limited temperature stability, up to only about 110° C.
  decomposition by micro-organisms which necessitates the use of biocides
  decomposition of the polymer chain in acids.

The water solubility and the temperature stability can be increased by derivatisation, e.g. hydroxypropylation or carboxymethylation. These polymers can be used up to about 135° C.

Since unconventional deposits frequently lie at greater depth, this improved temperature stability of modified polysaccharides is not sufficient for use. There is a need for polymers which also form hydrogels at temperatures above 200° C. and higher, which have sufficient viscosity and elasticity in order to transport supporting bodies.

The gels must have structurally viscous properties for effective transport of supporting bodies. The viscosity of the gel should decrease at an elevated shear. This ensures that the necessary pump pressure decreases during conveyance of the frac fluid. At low shear the viscosity should be high. This ensures that the supporting bodies are not deposited and block the borehole in zones having low flow rate or when the conveying is interrupted. This process must be reversible.

Synthetic polymers based on acrylamide and their hydrogels are usually characterised by a significantly improved temperature stability compared to the unmodified and modified polysaccharides and guar derivatives.

However, the hydrogels formed from these polymers have proved to be sensitive to saline waters. The viscosity of the polymer solutions decreases as a result of salt-polymer interaction, see, for example, Nasr-El-Din, H. A., Hawkins, B. F. and Green, K. A., 1991, Viscosity behavior of alkaline, surfactant, polyacrylamide solutions used for enhanced oil recovery, SPE 21028, Proc. Int. Symp. Oilfield Chem., Anaheim, Calif., USA; K. C. Taylor, H. A. Nasr-El-Din, Journal of Petroleum Science and Engineering 19 (1998) 265-280; R. E. Bulo et al., "Site Binding" of $Ca^{2+}$ Ions to Polyacrylates in Water: A Molecular Dynamic Study of Coiling and Aggregation, Macromolecules 2007, 40 3437-3442; T. Nylander et al., Formation of polyelectrolyte-surfactant complexes on surfaces, Advances in Colloid and Interface Science 2006, 123-126, 105-123; C. L. McCormick et al., Water-Soluble Copolymers, Macromolecules 1986, 19, 542-547.

This disadvantage entails a considerable application risk in oil and gas production since the deposit waters almost always have a certain salt content, in particular a high content of dissolved alkali and alkaline earth salts.

As already stated above, copolymers and of these acrylamide copolymerisates are familiar as adjuvants in the extraction of crude oil or natural gas.

DE 10 2004 035 515 A1 thus describes copolymers which are reversibly cross-linkable with polyvalent metal ions at temperatures higher than 150° C. for varying the permeability of an underground formation for water or saline water. The copolymers are obtained by radical polymerisation of 80 to 90 wt. % of a selected ethylene unsaturated sulfonic acid e.g. of AMPS, of 1 to 10 wt. % of an N-vinylamide of a carboxylic acid, e.g. N-vinylacetamide, of 1 to 10 wt. % of a selected N-vinyl-nitrogen heteroring, e.g. N-vinylpyrrolidone, and 0.1 to 5 wt. % of a vinylphosphonic acid and optionally up to 10 wt. % of an amide of an ethylene unsaturated carboxylic acid, e.g. (meth)acrylamide. The significantly improved thermostability, the good gel forming properties and the improved stability compared with saline waters are attributed to the use of these copolymers with phosphonic acid groups, open-chain and in particular cyclic vinylamides and only a low content of (meth)acrylamides.

WO 03/033860 A2 describes a method for reducing or for completely eliminating water influxes in an underground formation for producing crude oil or natural gas, whereby the aqueous solution of a selected copolymer is introduced together with or after a cross-linking agent in the form of selected metal ions into the borehole. The copolymers are obtained by radical polymerisation of 40 to 98 wt. % of a selected ethylene unsaturated sulfonic acid, i.e. of AMPS, of 0.1 to 58 wt. % of an acrylamide, 0.1 to 10 wt. % of an N-vinylamide of a carboxylic acid, e.g. N-vinylacetamide or an N-vinylpyrrolidone or N-vinylcaprolactam and 0.1 to 10 wt. % of a vinylphosphonic acid. The high adsorption at the rocks of the deposit, the elastic expansion-compression behaviour and the particular stability with respect to the salts in the deposit waters and over a wide temperature range are attributed to the use of these copolymers. In particular the high fraction of units which are derived from acrylamidoalkylene sulfonic acid are made responsible for the increased temperature and gel stability.

EP 0 112 520 A2 describes water-soluble copolymerisates, their reaction with polyvalent metal ions and their use as auxiliaries in textile dyeing and as retanning substances. Mention is also made of the use of copolymerisates and their metal chelates as thickeners of acids for crude oil and natural gas production. The copolymers are obtained by radical polymerisation of 1 to 86 wt. % of a vinylphosphonic acid, 9 to 80 wt. % of a selected ethylene unsaturated sulfonic acid, e.g. of AMPS, of 5 to 90 wt. % of a (meth)acrylamide, and optionally up to 30 wt. % of an N-vinylamide of a carboxylic acid, e.g. N-vinylacetamide, of a vinylphosphonic acid ester and/or of a (meth)acrylic acid in statistical distribution of the monomer units. These copolymerisates can be cross-linked by polyvalent metal ions and/or by acids. The copolymerisates are characterised by an extremely high viscosity of even diluted aqueous solutions of the metal chelates.

U.S. Pat. No. 6,986,391 B2 discloses a method for fracturing a subterranean crude oil or natural gas deposit. Here an aqueous viscous solution is pumped through a borehole in the deposit. This solution contains a terpolymer derived from 55 to 65 wt. % AMPS, 34.5 to 44.5 wt. % acrylamide and 0.1 to 1 wt. % acrylic acid as well as a cross-linking agent for this terpolymer and an additive having the property of bringing about a delayed reduction in the viscosity. In alternative embodiments a terpolymer is used which is derived from 15 to 80 wt. % AMPS, 20 to 85 wt. % acrylamide and up to 10 wt. % acrylic acid or which is derived from AMPS, acrylamide and acrylic acid.

US 2012/0101229 A1 discloses modified acrylamide hydrogels which can be used for secondary and tertiary extraction of crude oil. These comprise salt-resistant and water-absorbing compounds which have been produced by cross-linking of a polyacrylamide and a di- or polysaccharide with cross-linking agents such as with polyvalent metal ions. Interpenetrating networks are formed during the production of hydrogels. As polyacrylamides mention is made of partially hydrolysed polyacrylamides which can optionally have structural units derived from other copolymers, for example, from monomers with carboxyl, sulfonic acid, pyrrolidone or other hydrophobic groups.

WO 01/49971 A1 describes a method for treating hydrocarbon-bearing formations in which in addition to a hydrocarbon-containing zone, at least one water-containing zone is present. The method includes the sequential introduction of an aqueous polymer solution and an aqueous cross-linking agent solution followed by a further introduction of the aqueous polymer solution so that a collapsible gel is formed which promotes the hydrocarbon flux. The polymer contains 0.01 to 0.5 wt. % of cross-linkable carboxylate and/or phosphonate groups and has a molecular weight of 250,000 to 12,000,000. Certain zirconium or titanium salts are mentioned as cross-linking agents. Specifically mentioned copolymers are derived from vinylphosphonic acid and acrylamide, from vinylphosphonic acid and methacrylamide, and from vinylphosphonic acid, acrylamide and methacrylamide or these comprise selected graft polymers based on poly(meth)-acrylamide, which are grafted with vinylphosphonic acid.

Finally U.S. Pat. No. 8,022,015 B2 discloses a method for fracturing a subterranean deposit with temperatures between 149 and 260° C. In this case, an aqueous treatment solution is pumped through a borehole into the deposit at such pressures that a fracturing of the deposit takes place. The treatment solution contains a copolymer which is derived from AMPS, acrylamide and vinylphosphonic acid. Furthermore, the treatment solution contains polyvalent metal ions as cross-linking agents, phenothiazine or sodium thiosulfate and phenothiazine as stabilizers and a buffer which maintains a pH of 4.5 to 5.25. For the copolymer used the fraction of acrylamide is given as 20 to 90 wt. %, the fraction of AMPS is given as 9 to 80 wt. % and the fraction of vinylphosphonic acid is given as 0.1 to 20 wt. %. No information is found on the resistance of the cross-linked polymer to saline waters.

As before there is a need for copolymers which can be used in oil and gas production of unconventional or greatly exploited deposits and whose hydrogels have a high resistance to saline waters, which are sufficiently temperature-stable for this application and which have reversible, structurally viscous properties.

Surprisingly hydrogels have now been found which have this property profile.

The present invention relates to a temperature-stable hydrogel containing electrolyte-containing water and a copolymer cross-linked with polyvalent metal ions, characterised in that the copolymer at least contains structural units of which 0.005-20 wt. % are derived from an ethylene unsaturated phosphonic acid and its alkali metal salts and/or ammonium salts, of which 5-40 wt. % are derived from an ethylene unsaturated sulfonic acid as well as alkali metal salts and/or ammonium salts thereof and of which 5-94.995 wt. % is derived from an amide of an ethylene unsaturated carboxylic acid selected from the group acrylamide, methacrylamide and/or $C_1$-$C_4$-alkyl derivatives thereof, where the percentage information relates to the total mass of the monomers used in the copolymerisation, the polyvalent metal ions for the cross-linking of the polymers belong to the groups IIIA, IVB, VB, VIB, VIIB and/or VIIIB of the periodic table and the content of the electrolyte in the hydrogel is between 0.075 and 25 wt. % relative to the total mass of the hydrogel.

The temperature-stable hydrogel according to the invention can typically be used at temperatures up to 250° C. This means that the hydrogel still has a gel character at temperatures up to 250° C. or that its viscosity is still sufficiently high to ensure its use as frac fluid or that at temperatures up to 250° C. no appreciable decomposition of the hydrogel has occurred.

Electrolytes in the sense of the present invention are chemical compounds which in the dissolved state (in water) dissociate at least partially or completely into ions and which move in a directional manner under the influence of an electric field. Electrolytes which are present as completely dissociated into ions are designated as strong electrolytes; electrolytes which are present as only partially dissociated into ions are designated as weak electrolytes.

The electrolytes present in the hydrogel according to the invention comprise salts of the main group I and/or of the main group II and possibly of the main group III of the elements in the periodic system. Preferably these salts comprise hydroxides, sulfides, sulfites, sulfates, carbonates, hydrogen carbonates, nitrates, phosphates and halides, in particular chlorides and/or bromides. Preferred are sodium chloride, potassium chloride, magnesium chloride and/or calcium chloride.

Furthermore, the electrolytes in the hydrogel according to the invention can be present as salts of organic amines, preferably hydrochlorides of alkylamines and hydroxylalkylamines, particularly preferably trimethylammonium chloride and choline chloride.

The electrolytes contained in the hydrogel according to the invention can come from seawater used, formation water and/or salt solutions which are added to a frac fluid to prevent the swelling of clays.

The electrolyte content of the hydrogel according to the invention is between 0.075 and 25 wt. %, preferably between 0.1 and 15 wt. %, quite preferably between 0.1 and 10 wt. % relative to the total mass of the hydrogel.

When determining the electrolyte content, the structural units containing copolymers present in the temperature-stable hydrogel according to the invention of which 0.005-20 wt. % are derived from an ethylene unsaturated phosphonic acid and its alkali metal salts and/or ammonium salts, of which 5-40 wt. % are derived from an ethylene unsaturated sulfonic acid as well as alkali metal salts and/or ammonium salts thereof and of which 5-94.995 wt. % is derived from an amide of an ethylene unsaturated carboxylic acid selected from the group acrylamide, methacrylamide and/or $C_1$-$C_4$-alkyl derivatives thereof, wherein the percentage information relates to the total mass of the monomers used in the copolymerisation, as well as the polyvalent metal ions of the groups IIIA, IVB, VB, VIB, VIIB and/or VIIIB of the periodic table are not included quantitatively.

The copolymer used according to the invention comprises a copolymer which comprises structural units at least derived from ethylene unsaturated phosphonic acid(s), from ethylene unsaturated carboxylic acid amide(s) and from ethylene unsaturated sulfonic acid(s), and/or alkali metal salts thereof and/or ammonium salts thereof as well as optionally structural units derived from further monomers which can be copolymerised therewith.

Preferably used are copolymers which have structural units which are derived from vinylphosphonic acid and/or alkali metal salts thereof and/or ammonium salts thereof and/or allylphosphonic acid and/or alkali metal salts thereof and/or ammonium salts thereof, wherein these are used with amides which have structural units which are derived from acrylamide, methacrylamide, as well as N—$C_1$-$C_4$-alkyl derivatives thereof, preferably from acrylamide and/or methacrylamide.

Also preferably used are copolymers which have structural units which are derived from vinylsulfonic acid, 2-acrylamido-2-methylpropane sulfonic acid, 2-methacrylamido-2-methylpropane sulfonic acid, styrene sulfonic acid, and/or alkali metal salts thereof and/or ammonium salts thereof, preferably from 2-acrylamido-2-methylpropane sulfonic acid and/or 2-methacrylamido-2-methylpropane sulfonic acid.

The other monomers copolymerisable with carboxylic acid amides and with ethylene unsaturated sulfonic acids and/or alkali metal salts and/or ammonium salts thereof comprise ethylene unsaturated carboxylic acids and/or additional monomers copolymerisable therewith. The latter are in particular selected from the group of alkyl esters of ethylene unsaturated carboxylic acids, oxyalkyl esters of ethylene unsaturated carboxylic acids, esters of ethylene unsaturated carboxylic acids with N, N-dialkylalkanolamines and/or N-vinylamides.

The ethylene unsaturated carboxylic acids preferably comprise acrylic acid, methacrylic acid, fumaric acid, maleic acid, itaconic acid and/or crotonic acid as well as alkali metal salts thereof and/or ammonium salts thereof. The alkyl ester of ethylene unsaturated carboxylic acids preferably comprises an alkyl ester of the acrylic acid, methacrylic acid, fumaric acid, maleic acid, itaconic acid or crotonic acid, quite particularly preferably an alkyl ester having 1-8 C atoms.

The oxyalkylester of ethylene unsaturated carboxylic acids preferably comprises a 2-hydroxyethylester of acrylic acid, methacrylic acid, fumaric acid, maleic acid, itaconic acid or crotonic acid.

The ester of ethylene unsaturated carboxylic acids with N,N-dialkylalkanol amines preferably comprises N,N-dimethylethanolamine methacrylate, salts thereof or quaternary products.

The N-vinylamide preferably comprises N-vinylformamide, N-vinylacetamide, N-vinyl-N-methylacetamide or cyclic N-vinylamide compounds, preferably N-vinylpyrrolidone, N-vinylcaprolactam or N-vinylpyridine.

The copolymers used according to the invention are characterised in that they form hydrogels by cross-linking with polyvalent metal ions which have the necessary properties for use in frac fluids such as elasticity, viscosity and structural viscosity in the presence of saline waters or other salt-containing environments even at high temperatures.

This property distinguishes the hydrogels according to the invention compared with hydrogels derived from other synthetic copolymers which can certainly be structurally related.

This has the consequence that the hydrogels according to the invention show excellent stability under application conditions in the deposit under saline conditions at elevated temperatures whilst hydrogels from other polymers cannot be used since they denature under these conditions and they lose their viscosity or cannot form sustainable hydrogels. It is assumed that the phosphonic acid units are responsible for the relatively high stability of the cross-linking with metal ions.

The fraction of structural units derived from ethylene unsaturated phosphonic acid in the copolymer used according to the invention is usually from 0.005 to 20 wt. %, in particular from 0.05 to 5 wt. % relative to the total amount of monomers used in the copolymerisation.

The fraction of structural units derived from an amide of an ethylene unsaturated carboxylic acid selected from the group acrylamide, methacrylamide and/or $C_1$-$C_4$-alkyl derivatives thereof in the copolymer used according to the invention is usually from 5 to 94.995 wt. %, in particular from 10 to 50 wt. %, relative to the total amount of monomers used in the copolymerisation.

The fraction of structural units derived from an ethylene unsaturated sulfonic acid in the copolymer used according to the invention is usually from 5 to 40 wt. %, in particular from 10 to 30 wt. %, relative to the total amount of monomers used in the copolymerisation.

The fraction of structural units derived from other comonomers, i.e. from comonomers other than an ethylene unsaturated phosphonic acid, an amide of an ethylene unsaturated carboxylic acid and an ethylene unsaturated sulfonic acid in the copolymer used according to the invention is usually no more than 20 wt. %, in particular no more than 15 wt. %, relative to the total amount of monomers used in the copolymerisation.

The copolymers which were used in the invention can be synthesized by various radical polymerisation processes, for example, solution polymerisation, gel polymerisation or in particular inverse emulsion polymerisation. The advantages of inverse emulsion polymerisation is the high molecular weight of the copolymer obtained. Furthermore, the copolymer which is present in the inverse emulsion can be very rapidly hydrated. A further advantage is the handling of a liquid having a high copolymer content which is easier than the handling of aqueous solutions having a low copolymer content or the handling of wet gels from gel polymerisation or the handling of fine powder which is obtained from dried copolymer from gel copolymerisation. According to the invention, the polymer according to the invention is preferably synthesized by inverse emulsion polymerisation.

The polymerisable monomers can normally be used in commercially available quality, i.e. without further purification. The copolymers which were used in the invention are synthesized in a procedure known per se, e.g. gel polymerisation, solution polymerisation, and preferably inverse emulsion polymerisation in such a manner that the monomers which are to be polymerised are subject to a radical copolymerisation.

Within the framework of the description, radical polymerisation means that at least three monomers which are capable of forming structural units having the formulae (I), (II) and (III), optionally (IV) and/or (V) and which undergo radical polymerisation with one another within the framework of a radical copolymerisation are present. Consequently, copolymers having statistical and alternating distribution of the structural units derived from the at least three monomers or block copolymers in which blocks constructed of individual monomers and covalently linked to one another are obtained.

The process of inverse emulsion polymerisation is known per se. In this preferred polymerisation process, initially an aqueous or water-miscible hydrophilic phase which comprises monomers, is finely distributed in a non-water-miscible organic phase which contains water-in-oil emulsifiers and then the polymerisation is started, e.g. by radical-forming initiators.

The comonomers which are to be polymerised are advantageously then dissolved in the hydrophilic phase. Optionally solid monomers can be dissolved in liquid monomers. The comonomers can form the hydrophilic phase alone and be emulsified as such in the non-water-miscible organic phase or preferably the comonomers are dissolved in water and emulsified as aqueous solution. Water-insoluble or barely soluble monomers are normally dissolved in the hydrophobic liquid before adding the aqueous solution. Within the framework of the description, "water-soluble" means that 1 g of the substance is soluble in 1 liter of water at 25° C.

Relative to the total mass of the hydrophilic phase, the hydrophilic phase contains 10 to 100 wt. % of comonomers and 0 to 90 wt. % of water. The preferred process of inverse emulsion polymerisation is typically carried out in a 20 to 60 wt. % aqueous solution of monomers (in relation to the total mass of the aqueous phase).

A water-insoluble inert liquid is used as hydrophobic liquid. Such liquids are, for example, organic solvents, preferably hydrocarbons such as, for example, cyclohexane, n-pentane, n-hexane, n-heptane, i-octane, technical mixtures of hydrocarbons, toluene, xylene, halogenated hydrocarbons such as, for example, chlorobenzene, o-dichlorobenzene. Mixtures of various organic solvents can also be used.

In order to emulsify the non-water-miscible organic phase to a water-in-oil emulsion, typically a lipophilic tenside which preserves the finely distributed aqueous layer before coalescence is dissolved in the hydrophobic liquid used. Suitable lipophilic tensides are organic substances having a low HLB value such as, for example, sorbitan esters, sorbitan oleates or sorbitan stearates or ethoxylated fatty amides, glycerin fatty acid esters such as glycerin oleate or diacetyl tartaric acid esters of fatty acid glycerides, polysiloxanes or polyalkylene glycols. The HLB value describes the hydrophilic lipophilic balance of a tenside and is a measure for its hydrophilic or lipophilic fraction which is determined by calculation of the values for the various regions of the molecule. There are various methods for calculating the HLB value. The most common is the classification of the tensides between 0 and 20, where 0 stands for a completely lipophilic/hydrophobic molecule and a value of 20 corresponds to a completely hydrophilic/lipophilic molecule. Typically the supplier specifies the HLB value of the tenside. In the preferred process of inverse emulsion polymerisation, the HLB value of the lipophilic tensides is below 10.

The lipophilic tenside or a mixture of various lipophilic tensides, relative to the total mass of the formulation, is typically used in quantities of 0.05 to 15 wt. %, preferably 0.1 to 10 wt. %.

The volumes of the hydrophilic and hydrophobic phases typically have a ratio of 0.5 to 10:1.

The dispersion of the solution containing hydrophilic comonomers in the lipophilic tenside containing the hydrophobic solution is performed in a conventional manner, preferably by vigorous agitating. It is advantageous to carry out the copolymerisation in the absence of oxygen. This is ensured by passing inert gas, e.g. nitrogen, through the reaction mixture.

Copolymerisation is initiated in a manner known per se, e.g. by UV light, high-energy radiation, typically by adding a mixture of soluble, radical-producing initiators to the water-in-oil emulsion. Suitable initiators are organic or inorganic per- and azo-compounds, for example, benzoylperoxide, tert-butylhydroperoxide, cymene peroxide, methylethylketone peroxide, lauroylperoxide, tert-butylperbenzoate, tert-butyldiperphthalate, azodiisobutyronitrile, 2,2'-azobis-(2,3-dimethylvaleronitrile), 2-phenyl-azo-2,4-dimethyl-4-methoxy-valeronitrile, 2-cyano-2-propyl-azoformamide, azodiisobutyramide, dimethyl-, diethyl- or dibutyl-azobismethylvalerate, potassium persulfate, ammonium persulfate, hydrogen peroxide.

Preferably 0.001 to 2 wt. %, in particular 0.01 to 1 wt. % of initiators are used relative to the total mass of the monomers. The radical-forming initiator or the mixture of various radical-forming initiators can be added to the hydrophilic and/or hydrophobic phase of the emulsion.

The polymerisation reaction is carried out in a temperature range of −20° C. to 200° C., preferably of 10° C. to 90° C. The applied pressure is normally atmospheric pressure if the boiling point either of the aqueous phase or of the organic phase is not reached at the selected temperature. If the boiling point either of the hydrophilic phase or the organic phase is higher than the polymerisation temperature, an elevated pressure is applied to avoid boiling. In each case, the polymerisation can be carried out at elevated pressure if this is desired.

The copolymerisation is normally completed after 0.3 to 3 h. After copolymerisation has ended, the copolymer is present as a dispersion in a water-in-oil phase.

The finished water-in-oil dispersion typically consists of 20 to 90 wt. % of aqueous phase relative to the total mass of the formulation. The aqueous phase basically contains the entire copolymer and typically has a concentration in the range of 20 to 60 wt. % relative to the total mass of the aqueous layer. The continuous hydrophobic phase of the water-in-oil polymer dispersion, i.e. the liquid hydrocarbon solution and the lipophilic tensides are typically in the range of 10 to 80 wt. % relative to the total mass of the formulation.

For the application as gelling agents for frac fluids, the copolymers of the inverse copolymer emulsion must be freed from the micelles in the application fluid. This is achieved by destroying the micelles after the inverse copolymer emulsion has been metered into water or aqueous electrolyte solution and either sufficient mechanical energy has been applied by agitating or a suitable tenside having an HLB>10 is added to the dilution water or the aqueous electrolyte solution. This process is called inversion. In the presence of a suitable tenside, the inversion is completed within a very short time interval, e.g. a few seconds without building up agglomerates. The tenside having an HLB>10 can also be added directly to the inverse copolymer emulsion.

Copolymerisation can also be carried out as gel polymerisation method. With this process typically 5 to 60 wt. % of monomers (relative to the total mass of the mixture) are polymerised in water or a solvent mixture of water and another completely water-miscible solvent, for example, alcohol, using the known suitable catalyst systems without mechanical mixing using the Trommsdorff-Norrisch effect (Makromol. Chem. 1947, 1, 169).

Gel polymerisation is advantageously carried out in the absence of oxygen, e.g. in an inert gas atmosphere with nitrogen, at temperatures of −20° C. to 200° C., preferably of 10° C. to 90° C. The applied pressure is typically atmospheric pressure, should the boiling point of the mixture not be reached at the selected temperature. In each case, the polymerisation can be carried out at elevated pressure if this is desired.

The copolymerisation can be initiated by high-energy radiation or typically by adding a mixture of soluble, radical-producing initiators, for example, organic or inorganic per- and azo-compounds, for example, benzoylperoxide, tert-butylhydroperoxide, cymene peroxide, methylethylketone peroxide, lauroylperoxide, tert-butylperbenzoate, tert-butyldiperphthalate, azodiisobutyronitrile, 2,2'-azo-bis-(2,3-dimethylvaleronitrile), 2-phenyl-azo-2,4-dimethyl-4-methoxy-valeronitrile, 2-cyano-2-propyl-azoformamide, azodiisobutyramide, dimethyl-, diethyl- or dibutyl-azobismethylvalerate, potassium persulfate, ammonium persulfate, hydrogen peroxide, if suitable in combination with reducing agents, e.g. sodium hydrogen sulfite and iron-II sulfate or redox systems which, for example, have sulfinic acid as reducing compound. Usually 0.001 to 2 g of the polymerisation initiator per 100 g of monomers are used.

The copolymers which were used in the process of this invention are present in the form of an aqueous gelatinous mass and can be comminuted mechanically and dried and thus obtained in solid form. Preferably the aqueous gelatinous mass is applied directly and added to water or aqueous electrolyte solution for dilution. These copolymers only dissolve very slowly. The higher the polymer content of the added powder, gel or mixed-in solution, the longer the complete dissolution takes.

It is a significant application advantage if the dilution takes place in a short time and if homogeneous polymer solutions can be obtained. Particularly preferred therefore are hydrogels which originate from synthetic copolymers which are synthesized by inverse emulsion polymerisation.

The lower the electrolyte content of a solution, usually the more rapidly the copolymers dissolve therein. It can therefore be recommended to initially dissolve the copolymers in a higher concentration than the desired concentration in desalinated water or in an electrolyte solution having low electrolyte content and then subsequently dilute this solution with an electrolyte solution having higher electrolyte content so that the desired electrolyte and polymer concentration is achieved.

The average molecular weights of the copolymers used according to the invention can fluctuate widely. Hydrogels derived from synthetic copolymers having a high molecular weight are preferred.

The average molecular weights can be determined by means of gel permeation chromatography (GPC). In this case, commercially available polymers, e.g. of acrylamide having molecular weights of 1,140,000 Daltons and 5,550,000 Daltons can be used as standard. A column consisting of a polyhydroxymethacrylate copolymer network having a pore diameter of 30,000 Å can be used as separating medium. Typically the weight-average molecular weights of the copolymers used according to the invention lie between 10,000 and 25,000,000 Daltons (g/mol), preferably between 1,000,000 and 10,000,000 Daltons.

Particularly preferably polymer solutions containing copolymers having a weight-average molecular weight of at least 1 million Daltons are used to produce the hydrogels according to the invention.

The electrolyte-containing hydrogel according to the invention usually has a concentration of copolymers of 0.01 to 10 wt. %, preferably a concentration of 0.1 to 2.5 wt. % and particularly preferably a concentration of 0.2 to 1.5 wt. %, in each case relative to the total quantity of the hydrogel.

The hydrogel according to the invention can be cross-linked by cross-linking with the aforesaid polyvalent metal cations. Any water-soluble salts of these metal cations can be used, for example, hydroxides, sulfates or in particular halides such as chlorides. Other suitable anions are organic anions and/or combinations thereof such as, for example, lactates, citrates, gluconates or tartrates. Also suitable are complexes of these metal cations with organic O and/or N compounds such as, for example, alcohols, carboxylic acids, dicarboxylic acids, amines, diamines or hydroxyalkly amines, also combined with organic or inorganic anions. Salts and/or complexes of metal cations can be present in water and/or in a solvent miscible with water.

Particularly preferred are polyvalent cations of Groups IIIA, IVB, VB, VIB, VIIB and/or VIIIB of the periodic table selected from the group of cations of zirconium, aluminium, boron, titanium, chromium and/or iron. Particularly preferred are compounds of zirconium and/or titanium. Especially preferred are zirconium salts and/or its complexes.

To produce the hydrogels, the polyvalent metal cations in the form of their salts or complexes, ideally dissolved in water or in a solvent miscible with water, are added to the electrolyte-containing copolymer solution whilst agitating in order to ensure a homogeneous distribution of the metal cations in the solution. The three-dimensional polymer network forms and the original solution thickens to form the gel. The formation of the hydrogel can possibly be accelerated by adapting the agitating speed, the pH and/or by increasing temperature.

The concentration of the metal cations for the cross-linking in mol is related to the fraction of monomers with acid groups which are used in the copolymerisation, where the amount of monomers containing acidic groups in mol is calculated from the monomer composition.

Usually between $10^{-5}$ and 100 mol/mol metal cations per mol monomer with acid group, preferably between $10^{-3}$ and 2 mol/mol, quite preferably between 0.01 and 1 mol/mol metal cations per mol monomer with acid group are used.

The hydrogel according to the invention is characterised by a very good resistance to saline waters in particular at elevated temperatures. This means that the hydrogel does not suffer any appreciable degradation in the sedimentary rock and a pressure on the sedimentary rock built up by introducing the hydrogel laden with sand is maintained for a long time. For the purpose of this description the resistance to saline waters is characterised as follows:

The prepared hydrogel is heated to the desired temperature and its viscosity at the respective temperature is tracked rheometrically at a defined shear rate or optionally whilst varying the shear rate. At elevated temperatures it is ensured that no boiling processes take place by exposing the hydrogel to nitrogen pressure. The variation of the gel viscosity as a function of time and optionally of the shear rate is tracked and assessed.

Gel character in the sense of the present invention exists when the viscosity after the cross-linking is substantially higher than before the cross-linking. The hydrogels according to the invention are characterised in that they form stable networks at high temperatures up to 250° C. whose viscosity is substantially higher than that of the noncross-linked copolymer solution. Substantially means in this context that the viscosity of the gel at the same shear rate, pressure and temperature is min. 100% higher, preferably min. 400% higher.

The invention relates in particular to a method for the hydraulic fracturing of deposit rock in order to increase its permeability for the extraction of crude oil and/or natural gas where the electrolyte-containing hydrogel described above serves as a thickening agent and ensures effective transport of supporting bodies into the cracks formed in the rock.

A preferred method is characterised in that in order to produce the hydrogel, a solution of the copolymer in an electrolyte solution is produced either by stirring in the aqueous gelatinous mass or solutions from the gel and solution polymerisation or by inverting the inverse polymer emulsion, before introducing into the deposit a solution of a salt containing a polyvalent cation of Groups IIIA, IVB, VB, VIB, VIIB and/or VIIIB of the periodic table and optionally a buffer is added to this electrolyte-containing copolymer solution, so that the copolymer forms a three-dimensional network and that optionally further additives and supporting bodies are added to this solution and this is then pressed into the deposit.

A further preferred method is characterised in that in order to produce the hydrogel a solution of the copolymer is initially produced in higher concentration than the desired concentration in desalinated water or in an electrolyte solution having a low electrolyte content and this solution is then diluted with an electrolyte solution having higher electrolyte content so that the desired electrolyte and polymer concentration is achieved.

Quite particularly preferred is a method in which exclusively or partially saline water such as seawater or formation water is used as electrolyte solution to produce the copolymer solution. This is particularly advantageous since in dry areas or in off-shore areas fresh water is frequently not present or not present in sufficient quantities and seawater or formation water must be processed to produce the hydrogel.

The following examples explain the invention without restricting this.

EXAMPLES 1-4

POLYMERISATION IN INVERSE EMULSION

Example 1

Preparation of Polymer 1

37 g of sorbitan monooleate was dissolved in 160 g of $C_{11}$-$C_{16}$-isoparaffin. 100 g of water was placed in a glass beaker, cooled to 5° C. and 50 g of 2-acrylamido-2-methylpropane sulfonic acid and 10 g of vinylphosphonic acid were added. The pH was adjusted to 7.1 by means of an aqueous ammonia solution (25%). 223 g of acrylamide solution (60% solution in water) was then added.

The aqueous monomer solution was added to the solution of $C_{11}$-$C_{16}$ isoparaffin and sorbitan monooleate whilst agitating vigorously. It was rendered inert for 45 min with nitrogen.

For starting, 0.5 g of azoisobutyronitrile was dissolved in 12 g of $C_{11}$-$C_{16}$ isoparaffin and added to the reaction mixture. The solution was then heated to 50° C.

As soon as the maximum temperature was reached, the solution was heated by means of an oil bath for 2 h to 80° C. The suspension was cooled to room temperature and could be used without further processing.

Example 2

Preparation of Polymer 2

Preparation took place similarly to polymer 1 but with the following monomer composition:

50 g of 2-acrylamido-2-methylpropane sulfonic acid, 223 g of acrylamide solution (60% solution in water), 18 g of vinylphosphonic acid.

Example 3

Preparation of Polymer 3 (Comparison)

Preparation took place similarly to polymer 1 but with the following monomer composition:

50 g of 2-acrylamido-2-methylpropane sulfonic acid, 223 g of acrylamide solution (60% solution in water), 10 g acrylic acid.

Example 4

Preparation of Polymer 4 (Comparison)

Preparation took place similarly to polymer 1 but with the following monomer composition:

50 g of 2-acrylamido-2-methylpropane sulfonic acid, 223 g of acrylamide solution (60% solution in water).

The comparative polymers 3 and 4 were prepared in order to show that the preparation of the hydrogel is predominantly based on the interaction of the phosphonic acid function with the cross-linking agent ion. Only when vinylphosphonic acid is present, is it possible to produce reversibly cross-linkable hydrogels in the presence of salt ions. This should be confirmed by Examples 5 to 10.

Example 5

(Comparison): Cross Linking of the Polymer from Example 4 in Deionized Water In a commercially available Waring Blender 1 g of isotridecanolethoxylate (6EO) was dissolved in 199 g of de-ionized water by rapid mixing. Then 0.24 g of sodium thiosulfate was added whilst agitating. 3.23 g of the polymer emulsion from Example 4 (solid content: 27%) was injected into the funnel of the agitating container and agitated for another four minutes. Then 1 g of acetic acid solution (6% solution in water) and 1.04 g of zirconium (IV)-triethanolamine solution (25% solution in water) were added slowly whilst stirring and agitated for another one minute.

The gel was poured into a cylindrical measuring cell of a rheometer flushed with $N_2$ and the cell was sealed in a pressure-tight manner. In order to prevent boiling of the sample, the closed measuring cell was exposed to a differential pressure of 50 bar. $N_2$ gas was used for the pressurization.

Initially the reversibility of the cross-linking of the comparative polymer containing acrylic acid was investigated in de-ionized water at 65° C. and 200° C. The following shear rate ramp was predefined for these viscosity measurements: 6 cycles with the shear rate ramp 511 (3.5 min), 360 (15 s), 170 (15 s), 100 (15 s), 75 (15 s), 100 (13.5 min). The total measurement took 90 minutes.

Figure 1A:
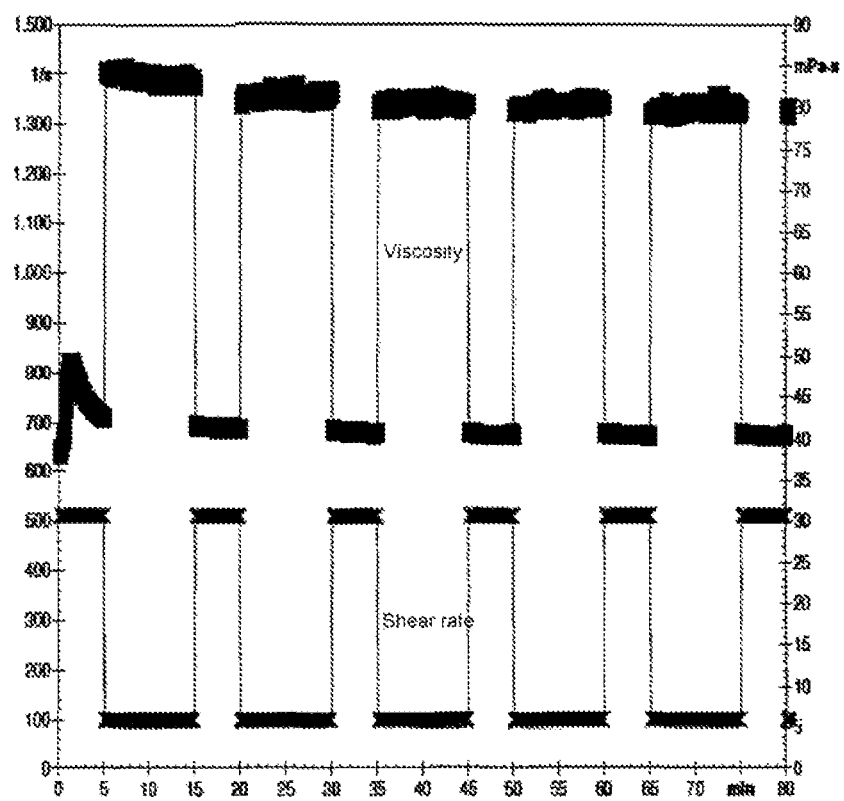
FIG. 1a shows the reversibility of the cross-linking of the comparative polymer from Example 4 at 65° C. The upper curve in FIG. 1a shows the behaviour of the viscosity and the lower curve shows the behaviour of the shear rate.
Figure 1B:
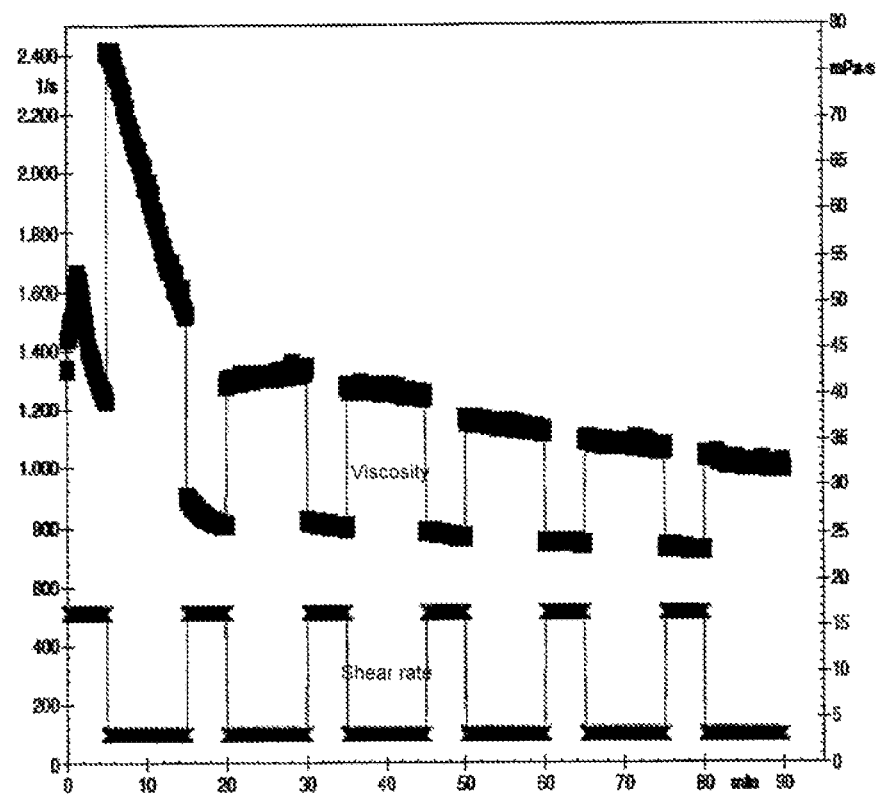
FIG. 1b shows the reversibility of the cross-linking of the comparative polymer from Example 4 at 200° C. The upper curve in FIG. 1b shows the behaviour of the viscosity and the lower curve shows the behaviour of the shear rate.

The viscosity measurement at 65° C. with the comparative polymer 4 shows that the cross-linking with the zirconium cross-linking agent in distilled water is only weakly defined (FIG. 1a). At 200° C. the viscosity is so low that no hydrogel capable of carrying supporting media is present (FIG. 1b).

Example 6

(Comparison): Cross-Linking of the Polymer from Example 4 in 2% KCl Solution In a commercially available Waring Blender, 1 g of isotridecanolethoxylate (6EO) was dissolved in 199 g of de-ionized water by rapid mixing. Then 0.24 g of sodium thiosulfate and 4 g of KCl were added whilst agitating. 4.39 g of the polymer emulsion from Example 4 (solid content: 27%) was injected into the funnel of the agitating container and agitated for a further four minutes. Then 0.5 g of 6% acetic acid solution and 0.8 g of a zirconium (IV)-triethanolamine solution (32.5% solution in ethanol) was added slowly whilst agitating and agitated for another one minute.

The gel was poured into a cylindrical measuring cell of a rheometer flushed with $N_2$ and the viscosity was measured at a shear rate of 100 $s^{-1}$, at 50 bar and 65° C.

Figure 2:
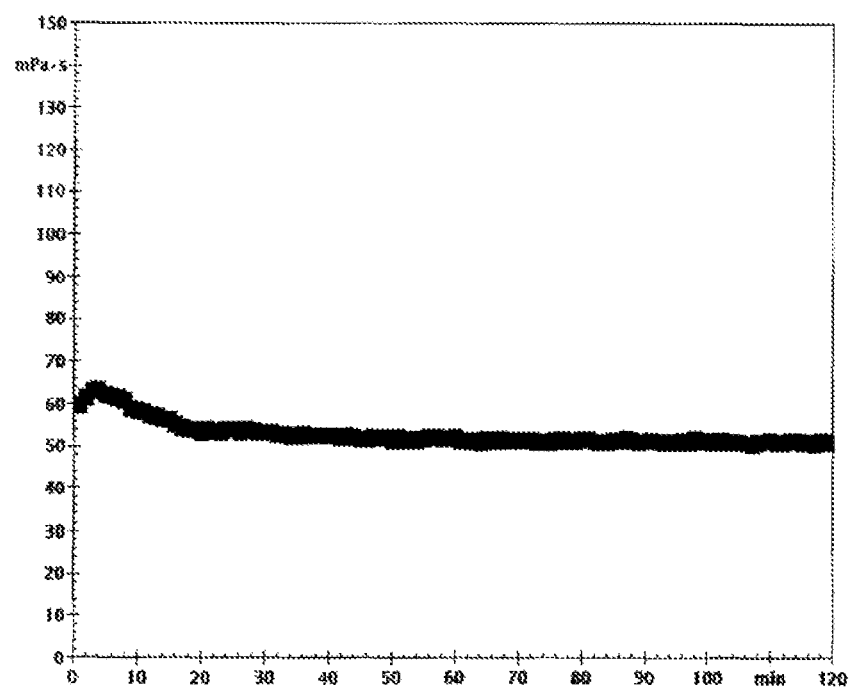

FIG. 2 shows the viscosity of the hydrogel in the presence of 2% KCl (comparative polymer from Example 4, 100 $s^{-1}$ and 65° C.).

The hydrogel from Polymer 4 has a low viscosity at constant shear in the presence of 2% KCl and is not suitable for fracturing formulations with HCl (FIG. 2).

Example 7

(Comparison): Cross-Linking of the Polymer from Example 3 in De-Ionized Water The gel was prepared and characterized using the polymer emulsion from Example 3 similarly to the procedure described in Example 5.

Figure 3A:
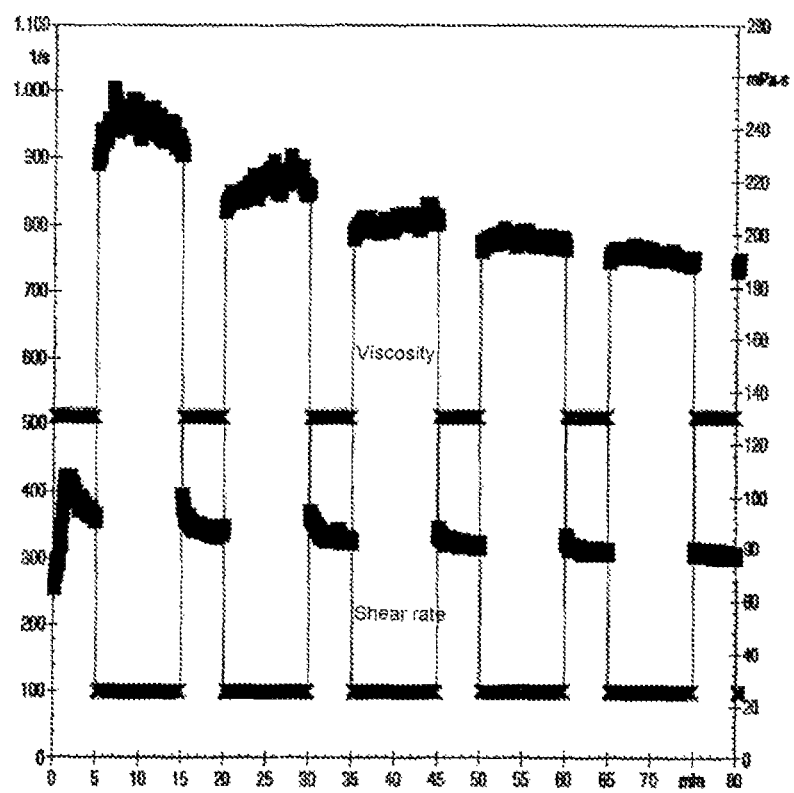

FIG. 3a shows the reversibility of the cross-linking of the comparative polymer from Example 3 at 65° C. The upper curve in FIG. 3a shows the behaviour of the viscosity and the lower curve shows the behaviour of the shear rate.

Figure 3B:
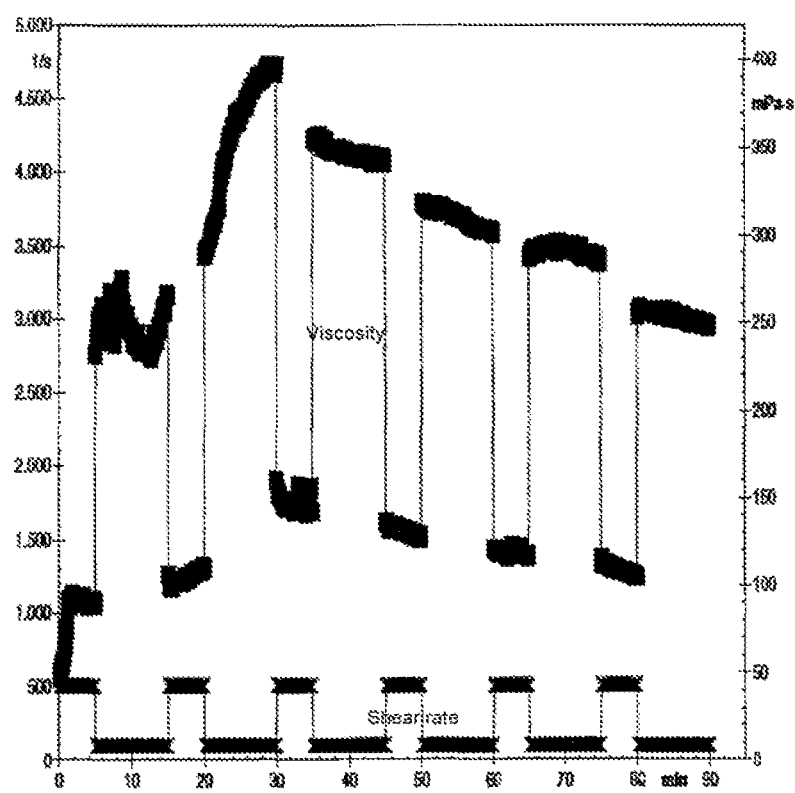

FIG. 3b shows the reversibility of the cross-linking of the comparative polymer from Example 3 at 200° C. The upper curve in FIG. 3b shows the behaviour of the viscosity and the lower curve shows the behaviour of the shear rate.

The hydrogel from comparative polymer 3, a copolymer of AMPS, acrylamide and acrylic acid has a higher viscosity in distilled water compared to the comparative polymer from Example 4 both at 65° C. and at 200° C. (FIGS. 3a and 3b).

Example 8

(Comparison): Cross-Linking of the Polymer from Example 3 in a 2% KCl-Solution

The gel was prepared and characterized using the polymer emulsion from Example 3 similarly to the procedure described in Example 6.

Figure 4:
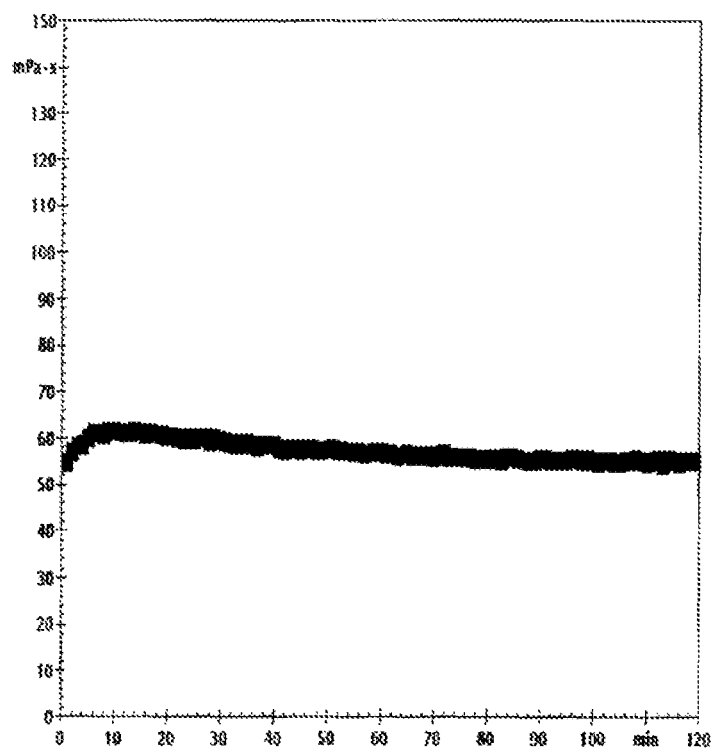

FIG. 4 shows the viscosity of the hydrogel in the presence of 2% KCl (comparative polymer from Example 3, 100 s$^{-1}$ and 65° C.).

The hydrogel from the comparative polymer 3, a copolymer of AMPS, acryl-amide and acrylic acid, like the hydrogel from Example 4 in the presence of KCl shows no stability (FIG. 4).

Example 9

Cross-Linking of the Polymer from Example 1 in De-Ionized Water

The gel was prepared and characterized using the polymer emulsion from Example 1 similarly to the procedure described in Example 5.

Figure 5A:
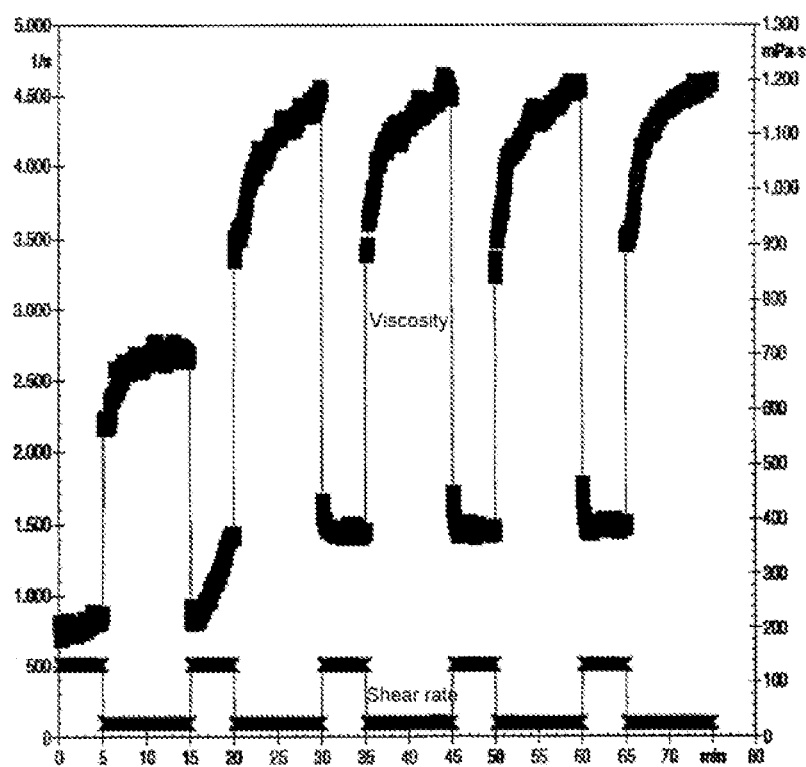

FIG. 5a shows the reversibility of the cross-linking of polymer 1 at 65° C. The upper curve in FIG. 5a shows the behaviour of the viscosity and the lower curve shows the behaviour of the shear rate.

Figure 5B:
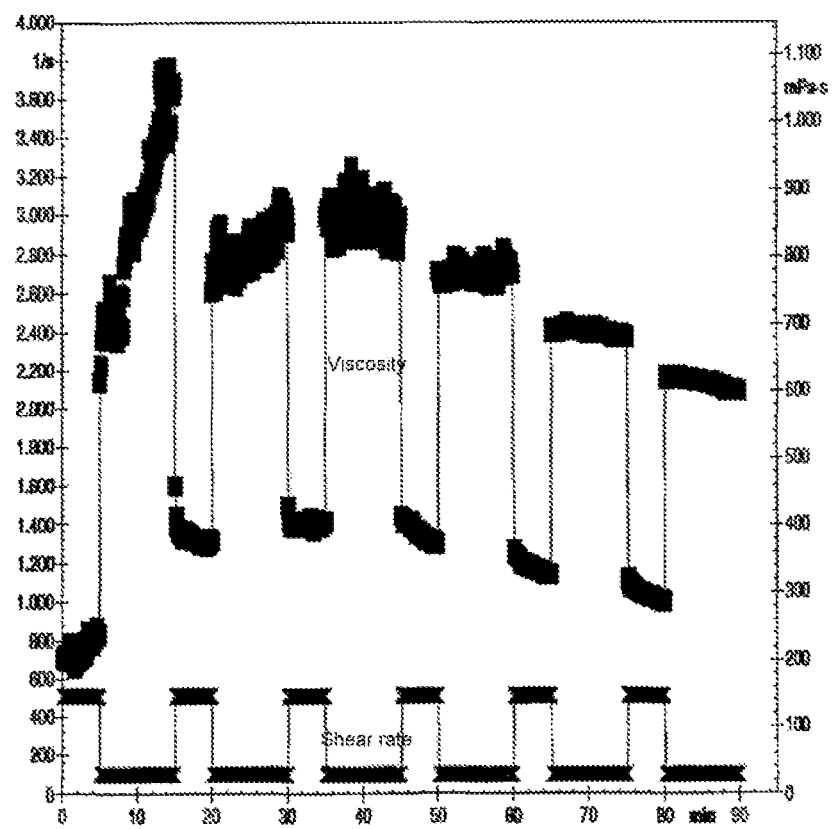

FIG. 5b shows the reversibility of the cross-linking of polymer 1 at 200° C. The upper curve in FIG. 5b shows the behaviour of the viscosity and the lower curve shows the behaviour of the shear rate.

Hydrogels from polymer 1 show structurally viscous behaviour in distilled water both at 65° C. and at 200° C. They are reversibly cross-linkable and suitable for transporting supporting agents in fracturing applications.

Example 10

Cross-Linking of the Polymer from Example 1 in a 2% KCl Solution

The gel was prepared and characterized using the polymer emulsion from Example 1 similarly to the procedure described in Example 6.

Figure 6:
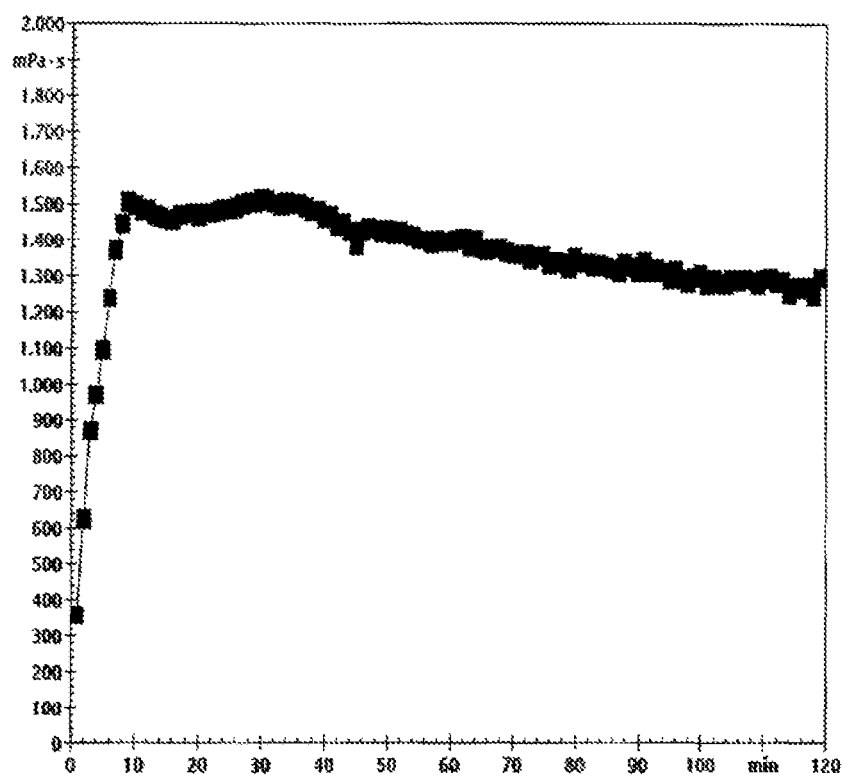

FIG. 6 shows the viscosity of the hydrogel in the presence of 2% KCl (Polymer 1, 100 s$^{-1}$ and 65° C.).

The hydrogel from polymer 1 also has a high viscosity in the presence of 2% KCl and is suitable for use as thickening agent in frac fluids.

Example 11

Cross Linking of the Polymer from Example 2 in a 2% KCl-Solution at 200° C., 160° C. and 82° C.

The gel was prepared using the polymer emulsion from Example 2 similarly to the procedure described in Example 6. The gel viscosity was measured on the rheometer at 50 bar, 160° C. and a shear of 100 s$^{-1}$.

Figure 7:
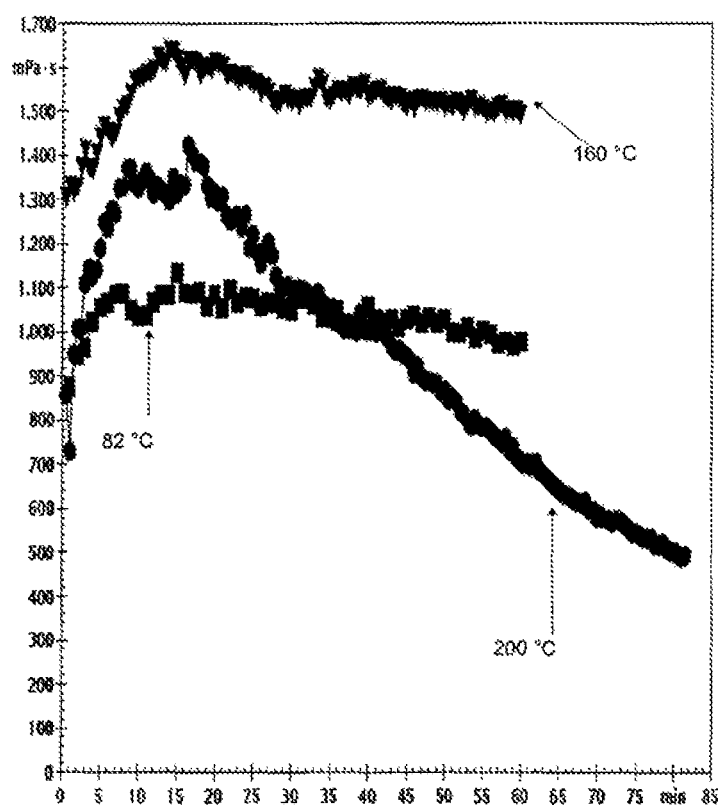

FIG. 7 shows the viscosity of the hydrogel in the presence of 2% KCl at 200° C., 160 C, 82° C. (Polymer 2, 100 s$^{-1}$).

Stable hydrogels are formed with polymer 2 which also have sufficiently high viscosity in the presence of 2% KCl at temperatures of 200° C.

Example 12

Polymer from Example 2 in Artificial Seawater at 160° C. and 82° C.

In a commercially available Waring Blender, 5.97 g of NaCl and 0.60 g of CaCl$_2$ were dissolved in 192.43 g of de-ionized water by rapid mixing. In the following examples this water was called artificial seawater or electrolyte water. Then 0.24 g of sodium thiosulfate was added whilst agitating. 4.39 g of the polymer emulsion from Example 1 (solid content: 27%) was poured into the funnel of the agitating container and agitated for another four minutes. 1 g of 6% acetic acid solution and 0.26 g of a zirconium (IV)-triethanol-amine solution (32.5% solution in ethanol) were added slowly whilst agitating and agitated for another minute.

The gel was poured into the cylindrical measuring cell of a rheometer flushed with N$_2$ and the viscosity was measured at the shear rate of 100 s$^{-1}$, 50 bar and 82° C. or 160° C.

Figure 8:
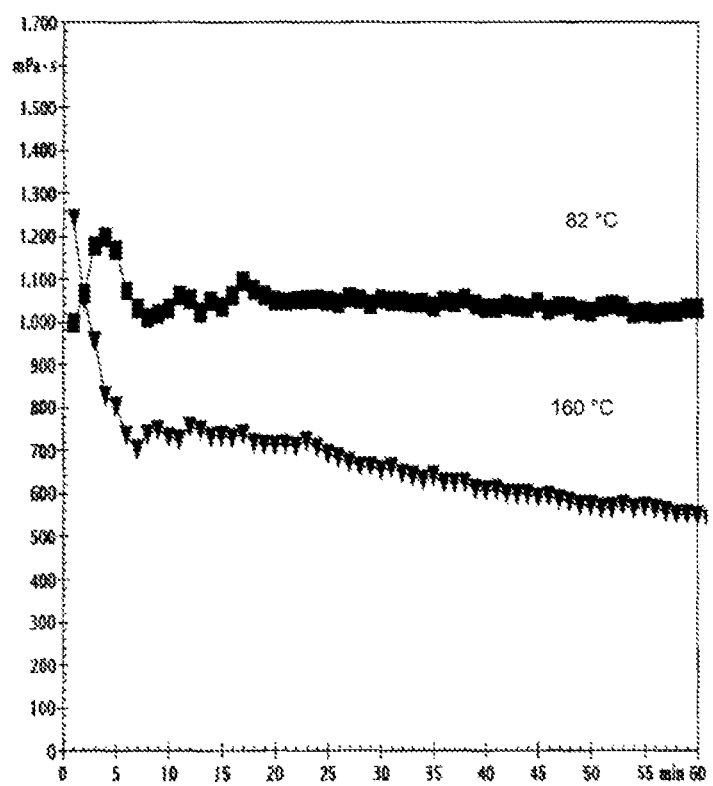

FIG. 8 shows the viscosity of the hydrogel in artificial seawater at 82° C. and 160° C. (Polymer 2, 100 s$^{-1}$).

Example 13

(Comparison): Rehealing of Hydrogels with Polymer from Example 3 in Artificial Seawater The gel was prepared using the polymer from Example 3 similarly to the procedure described in Example 12. The investigation of the reversibility of the cross-linking of the acrylic-acid-containing comparative polymer from Example 3 in artificial seawater was carried out on a rheometer at 50 bar and the respective temperature. The following shear rate ramp was predefined for these viscosity measurements: 6 cycles with the shear rate ramp 511 (3.5 min), 360 (15 s), 170 (15 s), 100 (15 s), 75 (15 s), 100 (13.5 min). The total measurement took 90 minutes.

Figure 9A:
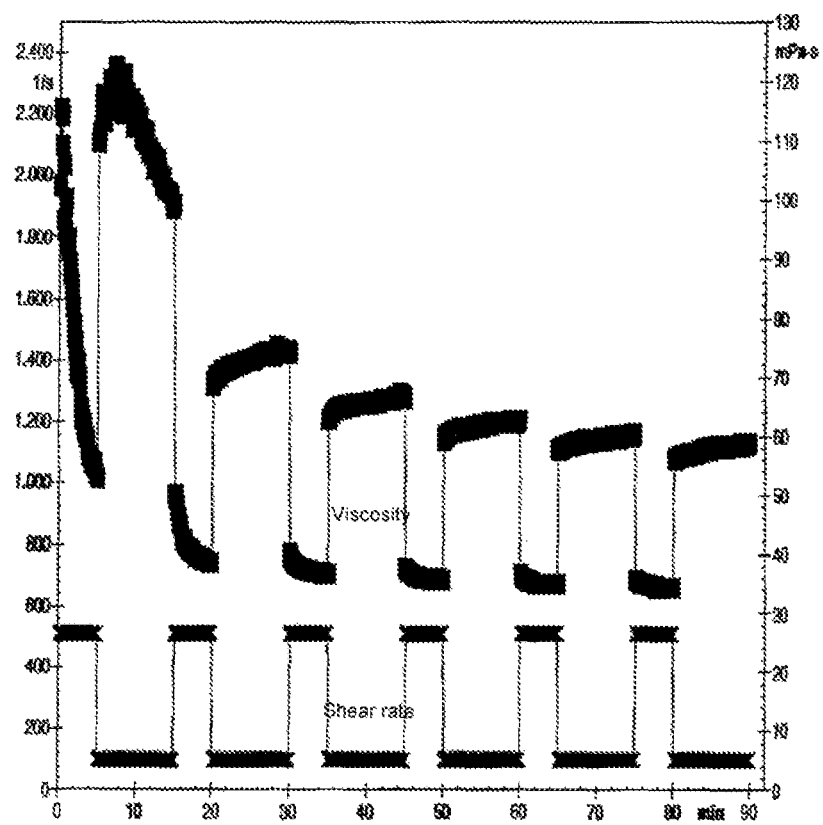

FIG. 9a shows the reversibility of the cross-linking in electrolyte water containing 3% NaCl and 0.3% CaCl$_2$ (comparative polymer from Example 3 at 82° C.). The upper curve in FIG. 9a shows the behaviour of the viscosity and the lower curve shows the behaviour of the shear rate.

Figure 9B:
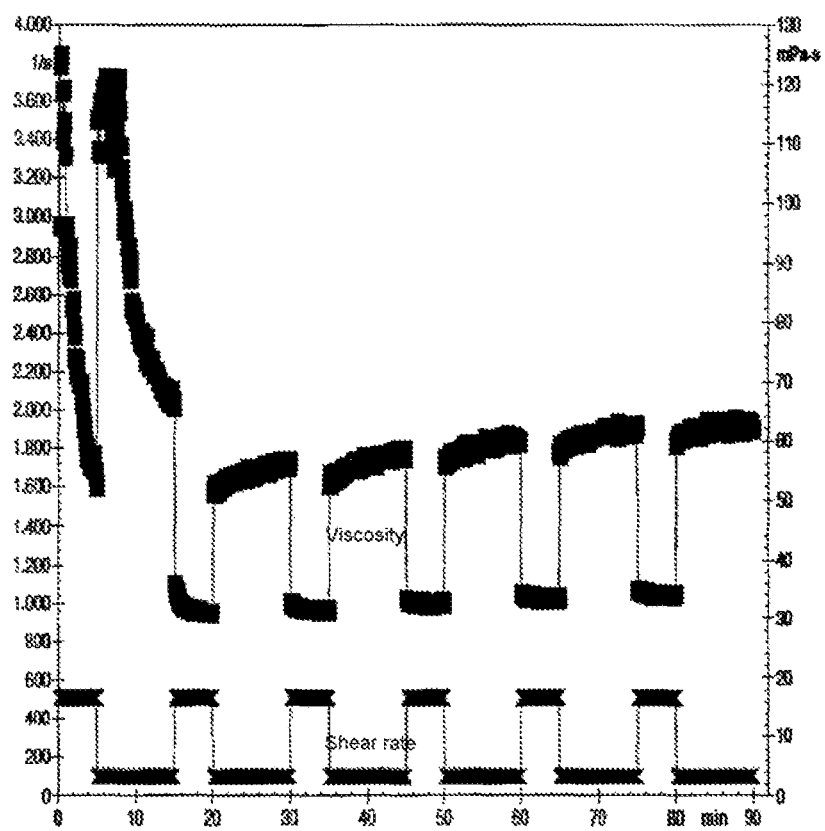

FIG. 9b shows the reversibility of the cross-linking in electrolyte water containing 3% NaCl and 0.3% CaCl$_2$ (comparative polymer from Example 3 at 130° C.). The upper curve in FIG. 9a shows the behaviour of the viscosity and the lower curve shows the behaviour of the shear rate.

In electrolyte water comprising 3% NaCl and 0.3% CaCl$_2$ the hydrogel from the acrylic-acid containing polymer exhibits no stability.

Example 14

Rehealing of Hydrogels with Polymer from Example 2 in Artificial Seawater

The gel was prepared similarly to the procedure described in Example 12 and was characterised on the rheometer according to Example 13.

Figure 10A:
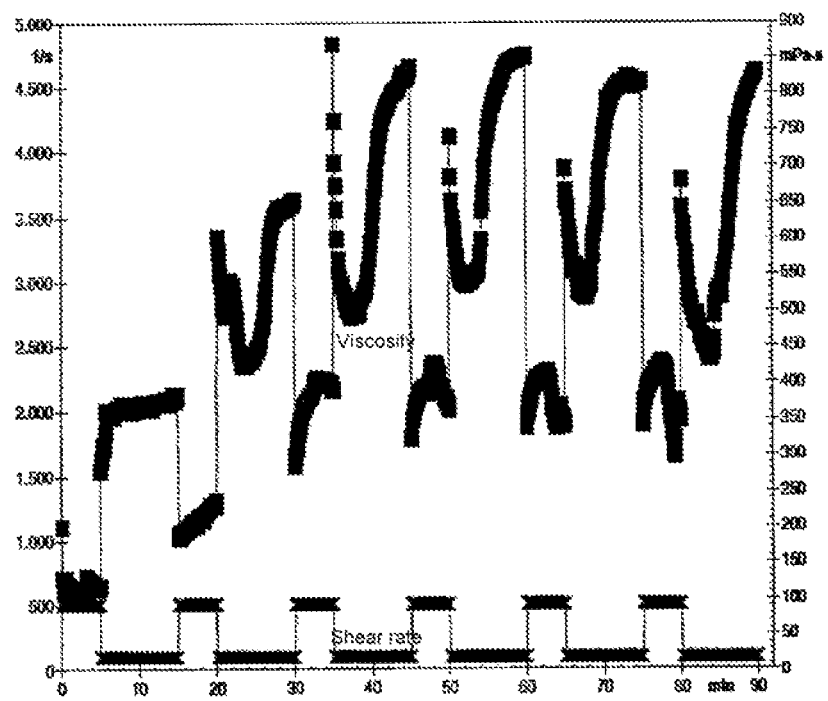

FIG. 10a shows the reversibility of the cross-linking in electrolyte water containing 3% NaCl and 0.3% CaCl$_2$ (polymer 2, at 82° C.). The upper curve in FIG. 10a shows the behaviour of the viscosity and the lower curve shows the behaviour of the shear rate.

Figure 10B:
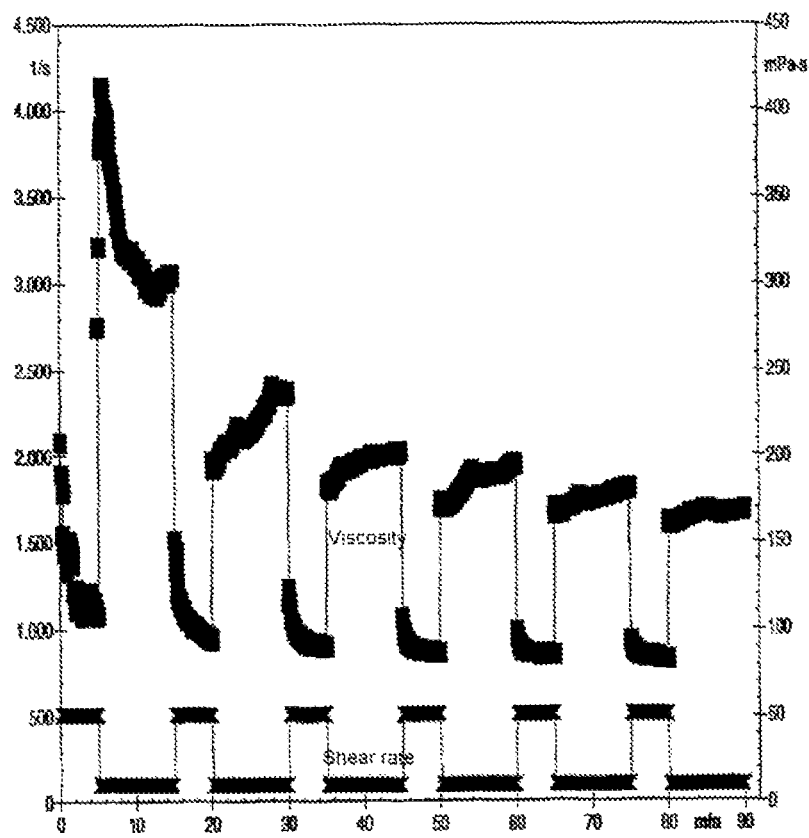

FIG. 10b shows the reversibility of the cross-linking in electrolyte water containing 3% NaCl and 0.3% CaCl$_2$ (polymer 2, at 130° C.). The upper curve in FIG. 10b shows the behaviour of the viscosity and the lower curve shows the behaviour of the shear rate.

Unlike the hydrogel from the acrylic-acid-containing polymer, the hydrogel from the vinylphosphonic acid-containing polymer 2 exhibits structurally viscous behaviour and can be used for the transport of supporting agents during the hydraulic fracturing of deposit rock.

What is claimed is:

1. Temperature-stable hydrogel containing water, comprising:
   at least one electrolyte and a copolymer cross-linked with polyvalent metal ions,
   wherein said copolymer contains structural units of which
      0.005-20% by weight of the total mass of monomers of said copolymer are of an ethylenically unsaturated phosphonic acid and at least one alkali metal salt or ammonium salt of said ethylenically unsaturated phosphonic acid;
      5-40% by weight of the total mass of monomers of said copolymer are of an ethylenically unsaturated sulfonic acid and at least one alkali metal salt or ammonium salt of said ethylenically unsaturated sulfonic acid; and
      5-94.995% by weight of the total mass of monomers of said copolymer are an amide of an ethylenically unsaturated carboxylic acid selected from the group consisting of acrylamide, methacrylamide and C$_1$-C$_4$-alkyl derivatives thereof,
   wherein said polyvalent metal ions are selected from the group consisting of groups IIIA, IVB, VB, VIB, VIIB and/or VIIIB of the periodic table; and
   wherein the electrolyte content in said hydrogel is between 0.075 and 25% by weight relative to the total mass of the hydrogel.

2. The hydrogel of claim 1, wherein said hydrogel has a gel character up to 250° C.

3. The hydrogel of claim 1, wherein the electrolyte content of said hydrogel is between 0.1 and 10% by weight relative to the total quantity of said hydrogel.

4. The hydrogel of claim 1, wherein said electrolyte comprises at least one of alkali-metal halides and alkaline earth metal halides.

5. The hydrogel of claim 1, wherein said electrolyte comprises salts of organic amines.

6. The hydrogel of claim 1 wherein said ethylenically unsaturated phosphonic acid is selected from the group consisting of vinylphosphonic acid, allylphosponic acid, their alkali metal salts and ammonium salts.

7. The hydrogel of claim 1, wherein said amide of the ethylenically unsaturated carboxylic acid is selected from the group consisting of acrylamide and methacrylamide.

8. The hydrogel of claim 1, wherein said ethylenically unsaturated sulfonic acid is selected from the group consisting of vinylsulfonic acid, 2-acrylamido-2-methylpropane sulfonic acid, 2-methacrylamido-2-methylpropane sulfonic acid, styrene sulfonic acid, their alkali metal salts and ammonium salts thereof.

9. The hydrogel of claim 1, wherein said copolymer additionally contains structural units comprising:
   at least one of an ethylenically unsaturated carboxylic acid, its alkali metal salts and ammonium salts; and
   an additional copolymerisable monomer, selected from the group consisting of alkyl esters of ethylenically unsaturated carboxylic acids, oxyalkyl esters of ethylenically unsaturated carboxylic acids, esters of ethylenically unsaturated carboxylic acids with N, N-dialkylalkanol amines and N-vinylamides.

10. The hydrogel of claim 9, wherein said ethylenically unsaturated carboxylic acid is a derivative of acrylic acid, methacrylic acid, fumaric acid, maleic acid, itaconic acid, crotonic acid, their alkali metal salts and ammonium salts.

11. The hydrogel of claim 9,
   wherein said alkyl ester is of acrylic acid, methacrylic acid, fumaric acid, maleic acid, itaconic acid or crotonic acid;
   wherein said oxyalkylester is a 2-hydroxyethyl ester of acrylic acid, methacrylic acid, fumaric acid, maleic acid, itaconic acid or crotonic acid;
   wherein said ester of ethylenically unsaturated carboxylic acids is N,N-dimethylethanolamine methacrylate, its salts or quaternary products; and
   wherein said N-vinylamides are at least one of N-vinylformamide, N-vinylacetamide, N-vinyl-N-methylacetamide and cyclic N-vinylamide compounds.

12. The hydrogel of claim 1, wherein said copolymer has been produced by inverse emulsion polymerisation.

13. The hydrogel of claim 1, wherein said copolymer has a weight-average molecular weight of at least 1 million Daltons when measured in a non-cross-linked state.

14. The hydrogel of claim 1,
   wherein said polyvalent metal ions are selected from the group consisting of cations of zirconium, aluminium, boron, titanium, chromium and iron.

15. The hydrogel of claim 1, wherein said copolymer is present in a concentration of 0.1 to 10% by weight, relative to the total quantity of said hydrogel.

16. A method for hydraulic fracturing of crude oil or natural gas deposits or reservoir stimulation of underground waters, comprising:
   pressing a hydrogel containing water into a crude oil or natural gas deposit wherein said hydrogel comprises:
      at least one electrolyte and a copolymer cross-linked with polyvalent metal ions,
         wherein said copolymer contains structural units of which
            0.005-20% by weight of the total mass of monomers of said copolymer are of an ethylenically unsaturated phosphonic acid and at least one alkali metal salt or ammonium salt of said ethylenically unsaturated phosphonic acid;
            5-40% by weight of the total mass of monomers of said copolymer are of an ethylenically unsaturated sulfonic acid and at least one alkali metal salt or ammonium salt of said ethylenically unsaturated sulfonic acid; and 5-94.995% by weight of the total mass of monomers of said copolymer are an amide of an ethylenically unsaturated carboxylic acid selected from the group consisting of acrylamide, methacrylamide and C1-C4-alkyl derivatives thereof, wherein said polyvalent metal ions are selected from the group consisting of groups IIIA, IVB, VB, VIB, VIIB and/or VIIIB of the periodic table; and wherein the electrolyte content in said hydrogel is between 0.075 and 25% by weight relative to the total mass of the hydrogel.

17. The method of claim 16, wherein said hydrogel is made by:

adding said copolymer to an electrolyte solution to make an electrolyte-containing copolymer solution;

adding a buffer to said electrolyte-containing copolymer solution, wherein said copolymer forms a three dimensional network;

adding additives and supporting bodies to said electrolyte-containing copolymer solution; and introducing into said crude oil or natural gas deposit a solution of a salt containing a polyvalent cation of at least one of groups IIIA, IVB, VB, VIB, VIIB and/or VIIIB of the periodic table.

18. The method of claim 16, wherein saline is used to make said copolymer solution.

* * * * *